United States Patent Office.

SAMUEL WHITMARSH, OF NORTHAMPTON, MASSACHUSETTS.

Letters Patent No. 98,652, dated January 4, 1870.

IMPROVED COMPOSITION FOR FLOORING, WAINSCOTING, AND OTHER PURPOSES.

The Schedule referred to in these Letters Patent and making part of the same.

*To all whom it may concern:*

Be it known that I, SAMUEL WHITMARSH, of Northampton, in the county of Hampshire, and State of Massachusetts, have invented a new and useful Composition of Matter suitable for Flooring, Wainscoting, and other Purposes; and I do hereby declare that the following is a full, clear, and exact description of the same.

The new composition of matter I have discovered, is applicable, among other purposes, to flooring, wainscoting, side panels, and black piano-keys, and may be turned up, in the lathe, into water-pails, spittoons, milk-pans, and other vessels; also, be used, in different ways, for other articles or purposes. For flooring, wainscoting, and side panels, it is designed to produce an article that shall be better adapted for general use, than the stony, brittle material or materials now in ordinary demand for such purposes, and which, as applied to flooring, will be stiller and more elastic to the tread, than stone or marble tiles, the same having a character which is between the nature of the hardest wood and marble. Said composition may be made of different colors, and various patterns or designs, and may be formed in dies, or be rolled into sheets, of any desired thickness, and is susceptible of a high polish.

The constituents of the composition are, linseed-meal, and a solution of rosin and asbestos, to which other materials may be added, as hereinafter described.

The proportion of the ingredients may be more or less varied, without materially affecting the character of the composition, but the proportions hereinafter specified will answer.

Thus, for certain work, I take one pound (1 lb.) of linseed-meal, and mix it in two pounds (2 lbs.) of rosin-solution, together with four pounds (4 lbs.) of asbestos, or, say, three pounds (3 lbs.) of asbestos, and one pound (1 lb.) of china or other fine clay. For other work, and where a high polish is required, the proportions may be, two pounds (2 lbs.) of linseed-meal, three pounds (3 lbs.) of rosin-solution, and three pounds (3 lbs.) asbestos, or only half that quantity of asbestos, and in its place, one and a half pound (1½ lb.) of cedar or hard-wood sawdust; and to these several ingredients, add one pound (1 lb.) of china-clay, one pound (1 lb.) of cotton-meal, one pound (1 lb.) of rice-meal, and one pound (1 lb.) of wheat-middlings.

To compound the article or composition, I first take common rosin, and dissolve it in benzine to about the consistency of molasses, which forms the rosin-solution herein referred to. The linseed-meal, asbestos, and other ingredients, may then be added indiscriminately, preferably first mixing the linseed, and (if used) cotton and rice-meals, together with the wheat-middlings, with water, into a paste. This makes the composition in the form of a cement. The materials (without sawdust) are all ground together in a mill, to the consistency of thick cream, which is afterward stirred and dried, as in working or drying potters' clay, till hard enough for the dies or rolls. Said composition dries without shrinking or warping, and when dry, should be baked for ten hours, more or less, at or under a moderate heat. A temperature of 350° Fahrenheit, or thereabout, will suffice. When thus baked, the composition is weather and water-proof, and hard, without being brittle. In preparing it, any suitable coloring-matter may be added. Wheat-middlings are introduced in the composition for the purpose of giving it a high polish, and cedar sawdust, to give it a perfume or scent.

What is here claimed, and desired to be secured by Letters Patent, is—

The composition of matter, made up of linseed-meal, rosin-solution, and asbestos, with or without other ingredients, substantially as specified.

SAMUEL WHITMARSH.

Witnesses:
A. PERRY PECK,
E. C. CRAFT.